Aug. 16, 1938.    H. H. HANSON    2,126,771
PROTECTIVE COVERING FOR UNCURED RUBBER PATCHES
Filed March 30, 1936    2 Sheets-Sheet 1
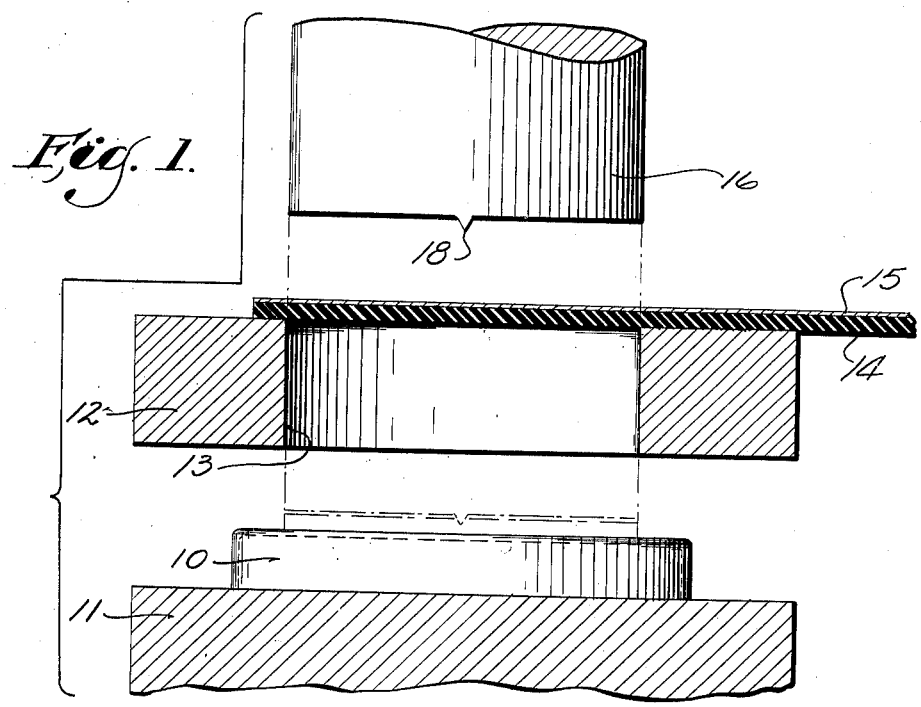
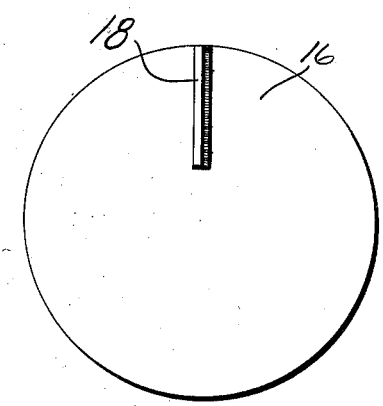
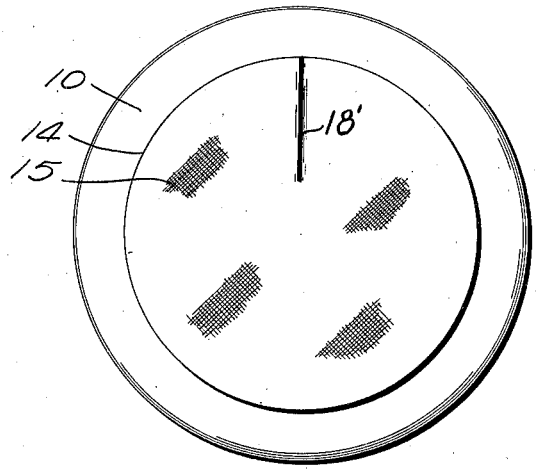
INVENTOR
Harold H. Hanson
BY
Wheeler, Wheeler + Wheeler
ATTORNEYS Aug. 16, 1938.       H. . H. HANSON       2,126,771
PROTECTIVE COVERING FOR UNCURED RUBBER PATCHES
Filed March 30, 1936       2 Sheets-Sheet 2
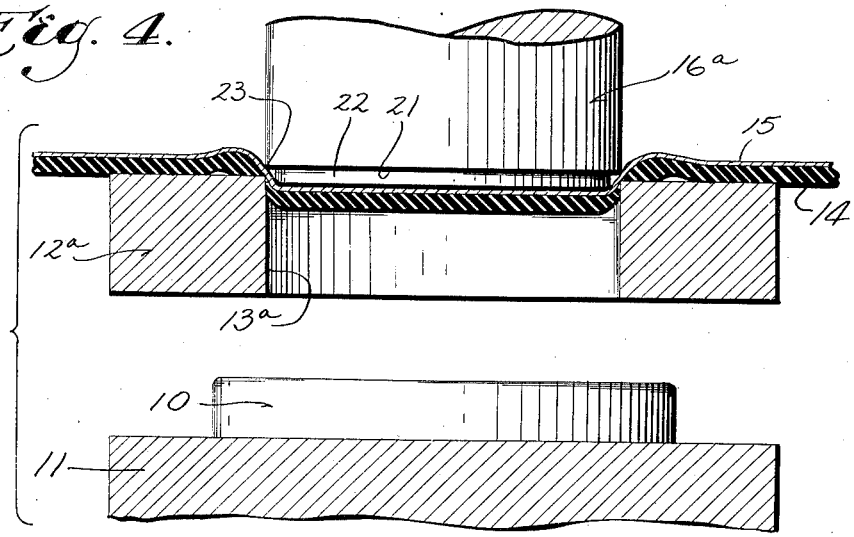
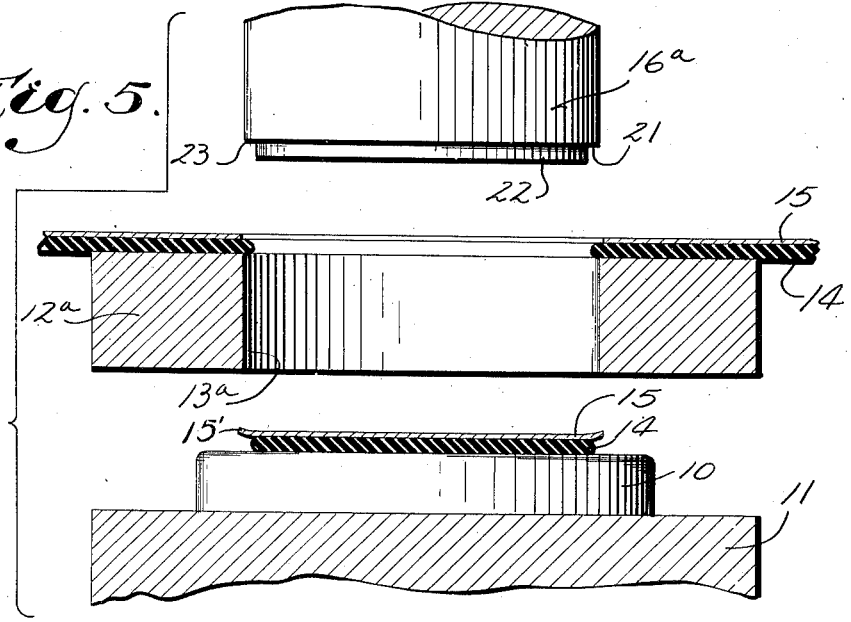
INVENTOR
Harold H. Hanson
BY
Wheeler, Wheeler & Wheeler
ATTORNEYS Patented Aug. 16, 1938

2,126,771

UNITED STATES PATENT OFFICE 2,126,771

PROTECTIVE COVERING FOR UNCURED RUBBER PATCHES

Harold H. Hanson, Waupun, Wis., assignor to The Shaler Company, Waupun, Wis., a corporation of Delaware Application March 30, 1936, Serial No. 71,697

3 Claims. (Cl. 152—367)

My invention relates to improvements in blanking and covering uncured rubber patches, and pertains to the product as well as the method.

The object of my invention is to provide an uncured rubber patch with a covering of protective fabric which can be readily grasped and pulled away from the rubber with minimum difficulty and minimum danger of disturbing a support to which the rubber has been adhesively applied.

More particularly, it is my object to provide means for blanking out rubber patches from sheets of uncured rubber and simultaneously blanking out and applying to the rubber blank a covering of suitable fabric, a portion of which is adapted to be used as a starter to facilitate stripping the fabric from the rubber preparatory to applying the latter to a ruptured rubber tube or other article to be repaired.

It is common practice to apply disks or strips of uncured rubber to one of the clamping platens of a vulcanizer, with one surface in adhesive relation to the platen and the other surface covered by suitable fabric to prevent deterioration during storage. Heretofore the protective covering has been of the same size as the rubber patch, and inexperienced persons attempting to make a repair have sometimes overlooked the necessity of removing the covering and at other times have loosened the patch from the platen in attempting to remove the covering.

My invention provides means for reminding the operator to remove the covering, and so facilitates its removal as to minimize the danger of dislodging or dislocating the patch from its factory predetermined position on the platen.

In the drawings:

Figure 1 is a view showing, in elevation, a punch press provided with a bed, a reciprocatory punch, an interposed die spaced from the bed and a pan-shaped platen in an inverted position on the bed, superposed strips or sheets of patch and covering material being also shown between the punch and die.

Figure 2 is a bottom view of the punch.

Figure 3 is a view of the patch as it appears with the protective covering thereon, after being applied to said pan-shaped platen.

Figure 4 is a view similar to Figure 1, showing a modified form of punch, as it appears during a blanking operation.

Figure 5 is a view of the same modified mechanism, with the punch in a retracted position, and the patch with its covering disposed upon a portable vulcanizing platen.

Like parts are identified by the same reference characters throughout the several views.

In the art of repair vulcanization, it has been common to employ a pan-shaped fuel containing platen 10, to the bottom of which a disk or strip of unvulcanized rubber is applied under pressure, to cause an adhesion of the rubber to the pan.

As shown in Figure 1, I place such platens in an inverted position on a suitable bed 11, above which a die 12 is supported. The die has an aperture 13, through which the blank may be forced when cut, this aperture having the contour of the patch. A sheet of rubber 14 and a superposed sheet of holland cloth 15, or other suitable protective covering, is fed over the die underneath a punch 16, the working surface of which is provided with a radially extending slitting blade 18, preferably V-shaped in cross section, as clearly shown in Figure 1. When the punch 16 is reciprocated, the blade 18 first comes into contact with the covering 15 and cuts a slit therein at one side of the center of the portion to be blanked out as indicated at 18' in Figure 3.

Continued downward movement of the punch severs the material 15 and the unvulcanized rubber 14 along the shearing margins of the die, and pushes the blank downwardly until it is brought into pressure contact with the up-turned bottom of the pan-shaped platen 10. The pressure will be sufficient to cause an adhesion of the rubber to the platen, and the increased pressure exerted by the blade 18 indents the rubber and tends to cause increased adhesion to the platen directly underneath the indentation.

Retraction of the punch will have a slight tendency to cause or permit a separation of the slitted fabric material 15 from the indented portion of the rubber, but this will be insufficient to produce more than a slight separation at the angle formed by the slit with the side margin.

When the patch is to be applied to a ruptured tire tube or other rubber article, this protective strip may be readily grasped at said angle and pulled away from the rubber, after which the platen will be placed with the rubber in contact with the article to be repaired and the rubber compressed by suitable clamping mechanism applied to the platen, whereupon the platen will be heated to impart a vulcanizing temperature to the rubber.

My experiments have shown that by slitting the protective fabric in the manner described, I provide a much improved means to facilitate the removal of the protective covering preparatory to the vulcanizing operation.

Referring to Figures 4 and 5, it will be noted that in place of the punch 16 shown in Figure 1, I employ a punch 16a, which has an annular shoulder at 21 and a downwardly projecting portion 22 of reduced diameter, and having a flat surfaced bottom. The die 12a has an aperture 13a of a diameter equal to that of the punch 16a above the shoulder 21. Therefore, the edge 23 at the periphery of the shoulder 21 is the cutting edge of the die. When the punch 16a is brought in contact with a sheet of protective fabric 15 superposed on a rubber sheet 14, the rubber is forced into the die aperture without initial cutting, and the margins of the patch blank are stretched. The associated portions of the covering 15 are driven downwardly into the die aperture by the portion 22, which serves as a plunger for that purpose.

When the cutting edge 23 of the punch enters the die it severs the fabric 15 and the stretched portion of the rubber directly underneath. The margins of the rubber blank thereupon contract, and when the blank passes through the die aperture the margins of the fabric covering project beyond the rubber as shown in Figure 5, the rubber blank being applied to the inverted platen in the same manner as above described with reference to Figure 1. The projecting marginal portions 15' of the covering therefore are adapted to serve as an annular grasping portion, equivalent at all points to an outwardly projecting starting lip.

In either form of construction, as soon as the starting portion of the covering has been grasped and lifted slightly, the rubber may be held in place on the platen with the finger or thumb of the other hand while the covering is being pulled away.

I claim:

1. A blank of uncured vulcanizable rubber patch material provided on its rupture closing face with a protective fabricated covering having a grasping portion disposed with an edge extending in a generally radial direction from the center of the blank.

2. A blank of uncured rubber patch material having its rupture closing face provided with a protective fabricated covering having a slit extending inwardly from one margin, the portions of the covering adjacent said slit constituting grasping portions adapted to facilitate removal of the covering from the rubber patch preparatory to clamping the uncovered surface of the patch upon the article to be repaired.

3. A rubber patch for tire tubes and the like, having a pressure receiving surface and an opposite surface adapted to be applied in covering relation to a rupture in a tire tube, said last mentioned surface being protected against deterioration, for storage and marketing purposes, by a removable fabricated covering having a grasping portion with a margin sufficiently elongated within the boundaries of said covering to be readily grasped to facilitate removal of said covering preparatory to applying the patch to a ruptured tire tube.

HAROLD H. HANSON.